Oct. 9, 1956     C. A. CHAYNE     2,765,883
BRAKE COOLING

Filed Feb. 9, 1951     2 Sheets-Sheet 1

Inventor
Charles A. Chayne
By Willits, Helwig & Baillio
Attorneys

Oct. 9, 1956

C. A. CHAYNE 2,765,883

BRAKE COOLING

Filed Feb. 9, 1951

Inventor
Charles A. Chayne
By Willits, Helwig & Baillio
Attorneys

United States Patent Office 2,765,883
Patented Oct. 9, 1956

2,765,883
BRAKE COOLING

Charles A. Chayne, Flint, Mich., assignor to General Motors Corporation, Detroit, Mich., a corporation of Delaware Application February 9, 1951, Serial No. 210,253

7 Claims. (Cl. 188—264)

This invention relates to brakes and more particularly to an improved air circulating arrangement for brake drums.

For many years automotive progress has been reflected in the increased weight and speed of our automotive vehicles. Both of these factors require brakes of increased capacity. Since a brake transfers the kinetic energy or the energy of motion of the vehicle into heat energy, the capacity of a brake is to a great extent limited by its capacity to dissipate heat. The heat dissipating capacity of a brake drum may be increased by increasing the braking surface area of the brake drum and the cooling fin area. However, at the same time the development of higher speed and higher weight vehicles required increased brake capacity, it was also found that the roadability and riding qualities of the vehicle could be improved by decreasing the wheel diameter. These vehicles require brake drums of a smaller diameter and thus a smaller surface area that would have a reduced capacity to dissipate heat energy. Many attempts have been made to solve this difficult problem. Among the more prominent solutions that have been offered to the industry are the various types of finned brake drums. The finned constructions provided improved cooling capacity when large diameter wheels were employed which allowed a large volume of cooling air currents to pass over the fins. When the small diameter wheels were employed where the wheel rims closely surrounded the brake drum, the circulation of air was highly limited and the fins proved inadequate to properly cool the brake drum. Many attempts have been made to solve this problem by providing means to increase the circulation of air over the brake drum. Several fan and scoop type devices were developed for use in conjunction with finned brake drums. These fan devices were supported on the drum or the wheel to direct the stream of air over the brake drum fins or the brake shoe. However, these devices fail to provide sufficient brake drum cooling capacity to permit the proper functioning of modern high pressure brakes at full capacity. It is believed that this may be due to the fact that the high pressure and long period of contact between the brake lining and a drum portion during brake application generates more heat at the brake drum surface than the brake drum material can dissipate. This condition results in hot spots and a type of brake failure known as "fading."

In accordance with the present invention, the brake drum cooling air passes first over the inside surface of the brake and then over the outside finned surface of the brake to a cooling fan. The brake lining material is made in the form of a plurality of segments attached to each of the brake shoes with large spaces between each segment. Thus a large air passage is provided between each brake shoe lining segment, through which cooling air may be drawn by the cooling fan. Thus the interior surface of the brake drum is cooled after contacting only a short distance of lining material. This prevents the building up of excessive temperatures at the braking surface of the brake drum which so often causes hot spots and brake failure. The cooling air then passes out through apertures in the brake drum and is drawn through the spaces between transverse fins by an educting fan connected to these passages. Thus it will be seen that the drum never passes over an extended strip of brake lining material to produce the overheating conditions found in the conventional drum. The brake drum temperature is limited in accordance with the invention since it only passes over a short strip of lining material before it is cooled by the cooling air current passing through the space between the small segments of lining material. The general temperature of the drum assembly is also reduced by the air passing through the transverse fins on the outside of the drum.

The primary object of the invention is to provide a brake drum cooling system in which a current of cooling air is drawn over both the interior and the exterior surfaces of the brake drum.

Another object of the invention is to provide in a brake cooling system a brake having a braking surface consisting of a plurality of segments and a fan arrangement to blow cooling air over the interior surface of the brake drum between the brake lining segments to cool the brake drum during brake operation.

Another object of the invention is to provide a brake drum cooling arrangement in which air is drawn transversely across the interior surface of the brake through spaces between the brake lining material and transversely across the exterior surface of the brake between cooling fins and exhausted through a fan.

These and other objects of the invention will be more apparent from the following description and drawing of the preferred embodiment of the invention.

Though the brake cooling system is applicable to many types of brakes, the cooling problem is especially important in connection with a brake assembly consisting of a tandem pair of servo type brakes mounted within one brake drum. These brakes, due to their high efficiency, generate a great deal of heat during braking, thus requiring a high capacity cooling system. For these reasons the invention is illustrated in connection with a tandem servo type brake.

Figure 1:
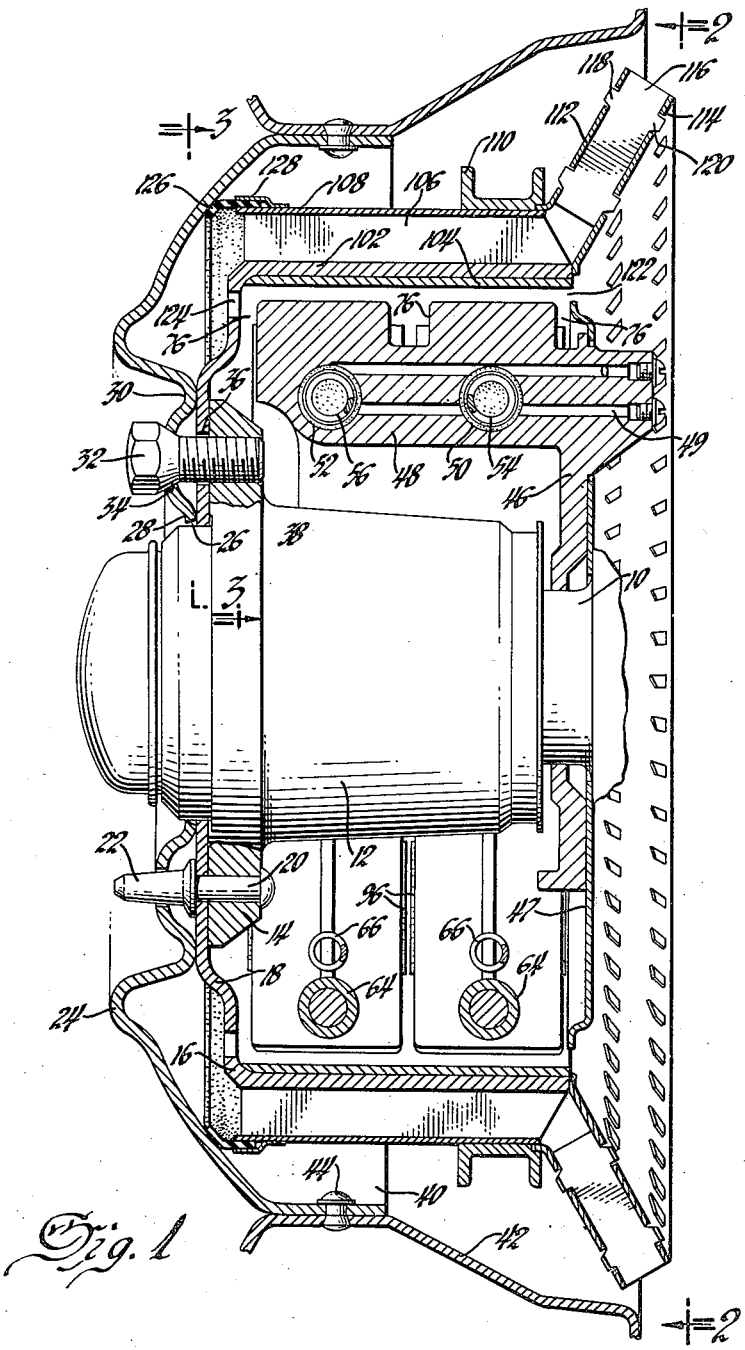
Figure 1 is an elevation view with parts in section showing details of the brake and the brake cooling mechanism.

The wheel and brake assembly is mounted on an axle 10 which is connected to the vehicle in a conventional manner, not shown. A wheel hub 12 having a radially extending flange 14 is rotatably supported by suitable bearings on the axle 10. The brake drum 16 has a radial annular flange 18 which has suitable apertures adjacent the inner periphery so that the brake drum may be secured to the hub flange 14 by the rivet members 20. The outer heads of the rivets 20 have attached or integrally formed therewith a locating pin 22 which fits within apertures in the disc wheel 24 to locate the disc wheel 24 on the hub. Referring particularly to Figure 1 it will be seen that the disc wheel 24 has a central aperture 26 fitting over the hub 12. The disc wheel has an inner annular seat 28 at the edge of aperture 26 and an outer annular seat 30 engaging the radial flange 18 of the brake drum adjacent the inner and outer edges respectively of the outer flange 14. The disc wheel 24 is secured to the hub flange by studs 32 which pass through suitable apertures 34 in the disc and 36 in the brake drum flange 18 and are threaded into threaded apertures 38 in the hub flange. The disc wheel 24 extends substantially radially outwardly in spaced relation to radial flange 18 of the brake drum and then terminates in the cylindrical flange 40. The wheel rim 42 is secured to the cylindrical flange 40 by suitable means such as the rivets 44.

The brake assembly is supported on a mounting flange 46 which is suitably secured to the axle housing of the vehicle suspension. An integral wheel cylinder and anchor extension 48 projects from the upper portion of the flange 46. A circular backing plate 47, fitting around the axle and supported by the mounting flange 46, closes the inner side of the brake drum 16 except for the peripheral space 122. The projection 48 which may be formed integrally with or attached to the flange 46 has formed therein a fluid supply line 49 leading to the inner master cylinder 50 and the outer master cylinder 52. The opposed inner pistons 54 are located in the inner wheel cylinder and similar opposed outer pistons 56 are located in the outer cylinder 52. The inner wheel cylinder pistons 54 operate against the inner pair of brake shoes 58 and 60 through actuating studs 62 connected between each piston and brake shoe. The lower end of the brake shoes 58 and 60 are connected together by the conventional wear adjusting strut 64 and spring 66. The outer pair of opposed wheel cylinder pistons 56 operate the outer brake shoes 68 and 70 through similar operating studs 62. The outer pair of brake shoes 68 and 70 are connected together at their lower end by a similar strut 64 and spring 66. An anchor flange 72 is welded to each upper edge of each brake shoe. The anchor flanges 72 extend beyond the end of the brake shoes and terminate in a pair of semi-cylindrical bearing recesses 74 at each side of each shoe. The anchor flanges 72 extend beyond the brake shoes and into recesses 76 in the anchor projection 48. An anchor pin 78 is positioned in the anchor projection at the base of each recess 76 to engage the recesses 74 at the end of each anchor flange 72. A retraction spring 80 is located on each side of the anchor and connected at one end to the anchor pin 78 in the center recess 76 and at the other end to a spring anchor pin 82 which passes through both of the brake shoes on that side of the anchor. Thus each of the anchor retraction springs 80 holds both of the brake shoes on one side of the brake in contact with the anchor pin 78 on that side of the brake. The similar retraction springs 80 are located on opposed sides of the brake and connected in the same manner to retain the brake shoes 68 and 58 on one side of the brake in contact with one anchor pin 78 and the brake shoes 60 and 70 on the other side of the brake in contact with the other anchor pin 78. The brake shoes are restrained from transverse movement only by the radially extending guide members 84 which have slots 86 fitting over the radial web of each of the brake shoes.

Figure 4:
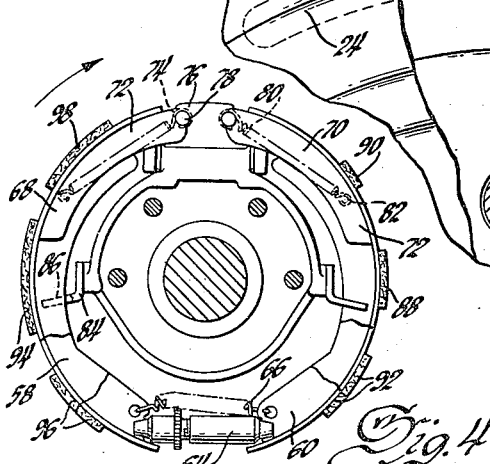
Figure 4 is a reduced detail view showing the arrangement and location of the brake lining segments.

The brake is designed for maximum braking effort when the vehicle moves in a forward direction. In this brake construction the brake drum moves clockwise, as illustrated by the arrow in Figure 4, around the brake shoe assembly when the vehicle moves in a forward direction. The primary brake shoe and the secondary brake shoe are provided with three lining blocks on each shoe. The primary shoes 60 and 70 have a medium sized block 88 substantially at the center of the brake shoe and at the center of compression. A smaller block 90 is located toward the anchor and operating end of the brake shoe midway between center block 88 and the anchor. A block 92 somewhat larger than block 88 is located midway between the block 88 and the strut 64. The primary shoe has three segments each larger than the adjacent segment. On the secondary shoes 58 and 68 the largest block 94 is located substantially at the center. The block located on the secondary shoes at the lower end has its lower edge substantially in alignment with the line of force transmitted through the adjusting strut 64 and is substantially the same size as the lower block 92 on the primary shoes. A lining block 98 of intermediate size is located at the top end of the shoe with its center substantially in alignment with the axis of the wheel cylinder. Each shoe has three lining segments secured thereto preferably by adhesive bonding and thus provides a large air passage between the lining segments through which cooling air may flow.

Figure 2:
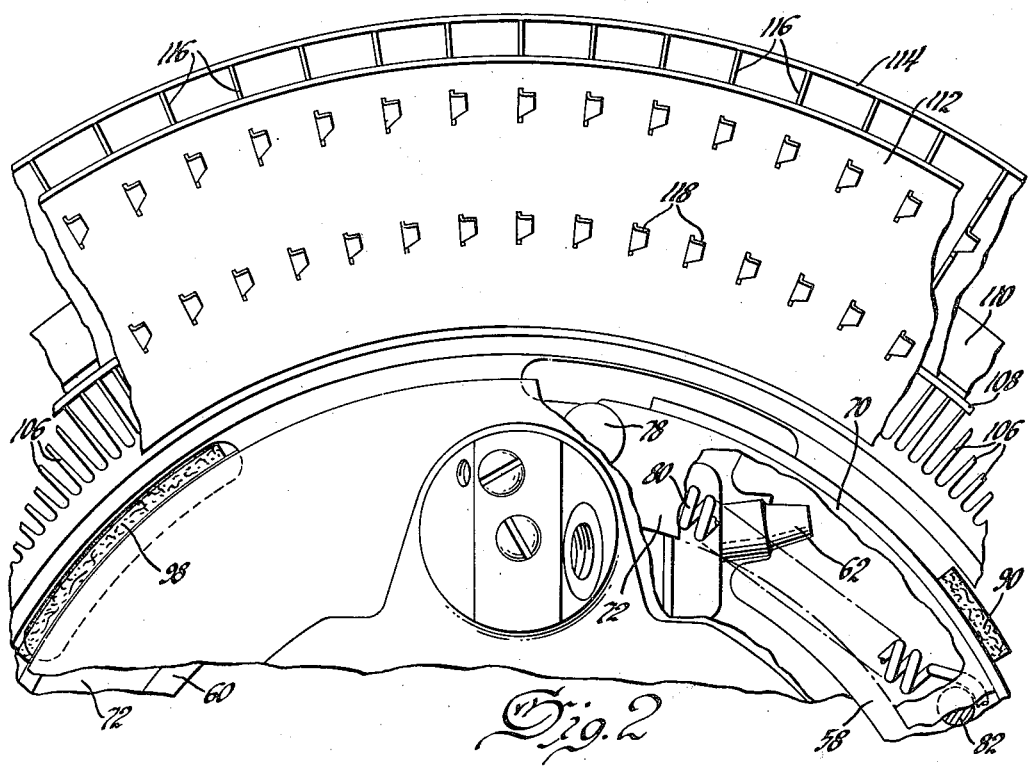
Figure 2 is a partial sectional view on the line 2—2 of Figure 1.
Figure 3:
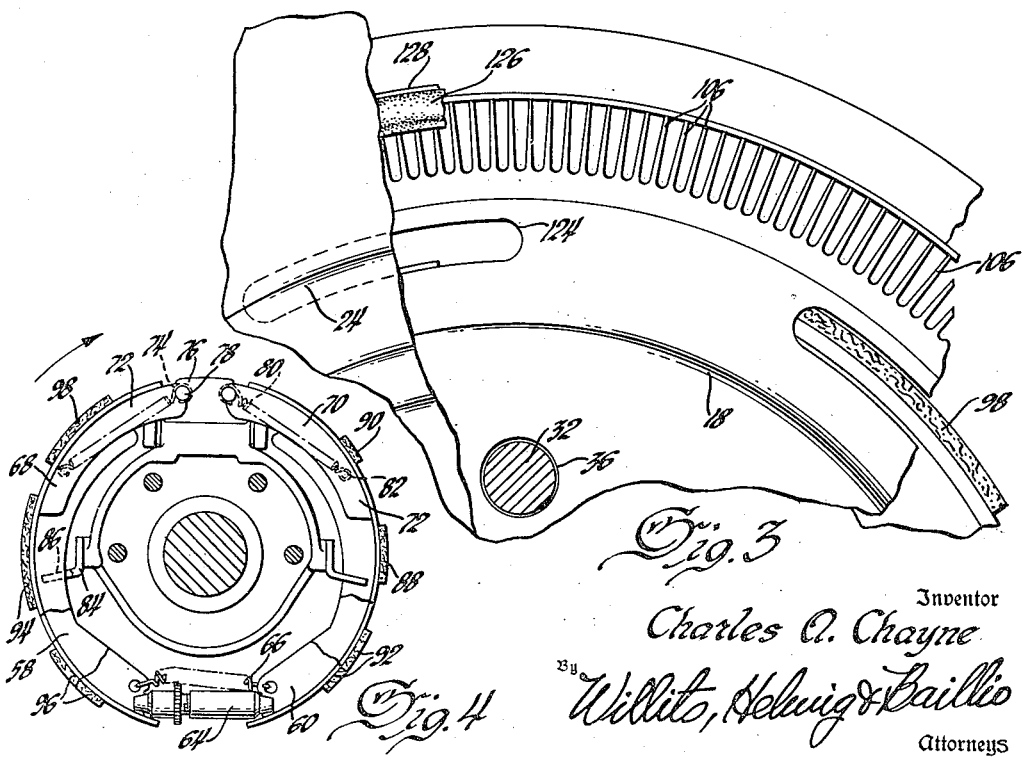
Figure 3 is a partial sectional view on the line 3—3 of Figure 1.

The brake drum 16 has a cylindrical flange 102 with the centrifugally cast lining 104 therein to provide the braking surface of the brake drum. The cylindrical flange 102 of the brake drum has formed integrally therewith or attached by suitable means a plurality of axial cooling fins 106. As illustrated in Figure 2, the cooling fins are fine and rather closely spaced, and thus provide a large cooling area and a great many transverse passages across the surface of the brake drum. The fins 106 are all the same height and are covered by a cylindrical cover member 108 to form closed air passages through the fins. The cover member 108 and the free edge brake drum is reinforced by a U-shaped reinforcing ring 110 located on top of the cover member 108 adjacent the free end of the brake drum cylinder 102. A cooling or eductor fan consisting of an outer annular plate 112 and an inner annular plate 114 and intermediate blade members 116 is attached to the brake drum to draw the air through the passages between the fins. The outer plate 112 is attached to the cover 108 and the reinforcing ring 110 and the inner blade of the eductor is secured to the cylindrical flange 102 of the brake drum by suitable means such as welding. As illustrated in Figure 1 it will be seen that the two flanges 112 and 114 extend radially outwardly and inwardly in parallel relation. Thus the rectangular fan blades 116 may be fitted between the annular flange plate with four tongues 118 extending through apertures 120 in the flange plates 112 and 114 to secure the blades and fan plates together as an assembly. As best shown in Figure 2, the tongues extend through the apertures in the fan blades and are bent over to fasten the assembly together by securing each blade to both plates.

The backing plate 47 is of generally circular shape and fits within the brake drum flange 102. The outer perimeter of the brake drum flange 47 terminates short of the lining 104 and provides a small circumferential space 122 between the backing plate 47 and the drum to allow cooling air to enter the brake drum. The radial flange 18 of the brake drum is provided with a series of circumferential apertures 124 immediately adjacent the cylindrical flange and braking surface 104 to provide an outlet for the cooling air passing between the shoes and drum between the lining segments. The space between the brake drum 16 and the wheel rim 24 is sealed to provide a confined air passage by a heat resistant synthetic rubber ring seal 126 which is secured to the cover plate by suitable securing band 128 welded to the cover 108.

Though it is believed that the operation of this device will be quite clear from the above detailed description of the mechanical features of the invention, it is believed that it will be desirable to briefly outline the preferred mode of operation. The hydraulic brakes are actuated by hydraulic fluid under pressure admitted to the wheel cylinders through the fluid supply line 49. The fluid pressure will expand in the pistons 54 and 56 in the cylinders 50 and 52 respectively. The pistons, acting through suitable brake actuating studs 62 which engage the brake shoes, expand the brake shoes into contact with the brake drum. When the brake drum is rotated as indicated by the arrow in Figure 4, the shoes 60 and 70 operate as primary shoes and rotate with the brake drum due to the frictional contact between the brake drum and the shoe. The brake shoe is moved with a force which is transmitted through the struts 64 to brake shoes 58 and 68. The secondary shoes 58 and 68 are thus forced into contact with the brake drum under the great force due to the action of the primary shoes 60 and 70 transmitted through the struts 64 and the secondary shoes pivot on the anchor pin 78. These brakes will produce a high braking effort and thus transform a large quantity of kinetic energy into heat energy. In order to provide maximum cooling capacity, the lining material is divided into segments so that a maximum area of the internal lining of the brake drum surface is exposed to cooling air. Thus it will be seen that as the brake drum passes over each lining segment, the temperature will rise due to frictional contact between the lining and the drum. However, due to the construction of this brake lining in short segments this temperature rise does not occur for a prolonged period. The brake drum is soon exposed to cooling air so that the temperature will be reduced directly at the internal surface by cooling air. For this reason the cooling capacity of this brake drum is not limited by the capacity of the brake drum material to conduct the heat away. The current of cooling air traverses both the internal and the external surfaces of the brake. The cooling air enters through the annular space 122 between the backing plate 47 and the brake drum. It will be noticed that this space is in alignment with the spaces between the brake lining segments and the brake shoes and the brake drum. Thus the cooling air is guided through the passages between the brake lining segments and the space at the end of the end segment of each shoe. The air passes through these passages between the brake lining segments across the brake drum and out through the apertures 124 to the space between the brake drum flange 18 and the wheel disc 24. Since this space or reversing chamber is sealed just above the fins 106 by sealing member 126, the direction of flow of the cooling air is reversed and the air must pass out through the passages between the brake drum fins 106, traverses completely across the brake drum through the passages between the fins 106 and is confined therein by the cover 108 to the eductor fan. Thus the exterior surface of the brake drum is cooled. The cooling or eductor fan pulls the air out of these passages and exhausts it to atmosphere under a slight head. Thus there is a forced current of air across the inside surface of the brake drum between the lining segments from the inside of the wheel to the outside and a forced current of air between the fins from the outside of the drum to the inside.

The above detailed description of a preferred embodiment of the invention is not to be considered as limiting the invention since many modifications of the structure will occur to those skilled in the art within the scope of the invention.

I claim:

1. In a brake, a brake drum having a flange, a backing plate, brake shoes mounted within said drum, means to operate said brake shoes, brake lining segments secured to said shoes with spaces between the segments, means mounted on said drum to provide a current of cooling air, an annular opening between the brake drum and backing plate adjacent the interior surface of the brake drum to guide cooling air transversely across the interior surface of said brake drum between said lining segments, and said brake shoes, an aperture in said brake drum flange adjacent the interior surface of the brake drum to permit the cooling air to reach the exterior of the drum, a guide to reverse the direction of flow of the cooling air, and means to guide cooling air across the exterior surface of the brake drum.

2. In a brake, a brake drum, brake shoes mounted within said drum, means to operate said brake shoes, brake lining segments secured to said shoes with spaces between the segments, means to form a cooling air passage extending transversely completely across the interior surface of said brake drum between said lining segments, a guide passage to reverse the direction of flow of the cooling air, and means to form a cooling air passage extending across the exterior surface of the brake drum, a pair of annular walls providing a substantially radial extension of said last named passage, and a plurality of fan blades positioned between said annular walls to force a current of air through said passages.

3. In a wheel, a hub, a brake drum having a supporting flange secured to said hub, brake means mounted within said brake drum, means to support and actuate said brake means, a plurality of spaced lining segments secured to each brake shoe and providing internal cooling passages between the segments, a plurality of apertures in said brake drum flange opposite said lining to provide a continuation of said internal cooling passages, a plurality of transverse passages on the external surface of said brake drum providing external cooling passages, means to form a direction reversing chamber between the internal and external passages, a cooling fan comprising an annular plate secured to said drum on the flange free side and another annular plate secured to the cover on the flange free side, and said plates extending substantially radially and having fan blades secured between the plates to draw air through the internal cooling passage, the reversing chamber and the external cooling passage.

4. In a wheel, a hub, a brake drum having a supporting flange secured to said hub, brake shoe means mounted within said brake drum, means to support and actuate said brake shoe means, a plurality of spaced lining segments secured to said brake shoe means and providing internal cooling passages between the segments, a plurality of apertures in said brake drum flange opposite said lining to provide a continuation of said internal cooling passages, a plurality of transverse fins on the external surface of said brake drum, a cover member positioned over said fins to form external cooling passages between the fins, means to form a direction reversing chamber between the internal and external passages, a cooling fan comprising an annular plate secured to said drum on the flange free side and another annular plate secured to the cover on the flange free side, and said plates having fan blades secured between the plates to draw air through the internal cooling passage, the reversing chamber and the external cooling passage.

5. In a wheel, a hub, a brake drum having a supporting flange secured to said hub, a plurality of brake shoes mounted within said brake drum, means to support and actuate said brake shoes, a plurality of spaced lining segments secured to each brake shoe and providing internal cooling passages between the segments, a plurality of apertures in said brake drum flange opposite said lining to provide a continuation of said internal cooling passages, a plurality of transverse fins on the external surface of said brake drum, a cover member positioned over said fins to form external cooling passages between the fins, means to form a direction reversing chamber between the internal and external passages, a cooling fan comprising an annular plate secured to said drum on the flange free side and another annular plate secured to the cover on the flange free side, and said plates extending substantially radially and having fan blades secured between the plates to draw air through the internal cooling passage, the reversing chamber and the external cooling passage.

6. In a wheel, a hub, a brake drum having a supporting flange secured to said hub, a plurality of brake shoes mounted within said brake drum, means to support and actuate said brake shoes, a plurality of spaced lining segments secured to each brake shoe and providing internal cooling passages between the segments, a plurality of apertures in said brake drum flange opposite said lining to provide a continuation of said internal cooling passages, a wheel secured to said hub and sealed to said brake drum flange, a plurality of transverse fins on the external surface of said brake drum, a cover member positioned over said fins to form external cooling passages between the fins, said cover member being sealed to said wheel to form a direction reversing chamber between the internal and external passages, a cooling fan comprising an annular plate secured to said drum on the flange free side and another annular plate secured to the cover on the flange free side, and said plates extending substantially radially and having fan blades secured between the plates to draw air through the internal cooling passage, the reversing chamber and the external cooling passage.

7. In a wheel, a hub, a brake drum having a supporting flange secured to said hub, a plurality of brake shoes mounted within said brake drum, means to support and actuate said brake shoes, a plurality of spaced lining segments secured to each brake shoe and providing internal cooling passages between the segments, a plurality of apertures in said brake drum flange opposite said lining to provide a continuation of said internal cooling passages, a wheel secured to said hub and sealed to said brake drum flange, a plurality of transverse fins on the external surface of said brake drum, a cover member positioned over said fins to form external cooling passages between the fins, said cover member being sealed to said wheel to form a direction reversing chamber between the internal and external passages, a reinforcing ring securing said cover member in position and reinforcing said drum on the flange free side, a cooling fan comprising an annular plate secured to said drum on the flange free side and another annular plate secured to the cover on the flange free side, and said plates extending substantially radially and having fan blades secured between the plates to draw air through the internal cooling passage, the reversing chamber and the external cooling passage.

References Cited in the file of this patent
UNITED STATES PATENTS

| Number | Name | Date |
|---|---|---|
| 1,752,377 | Glueck | Apr. 1, 1930 |
| 1,847,319 | Wentworth | Mar. 1, 1932 |
| 1,847,680 | Thompson | Mar. 1, 1932 |
| 1,905,657 | Tarbox | Apr. 25, 1933 |
| 1,966,169 | Forbes | July 10, 1934 |
| 2,109,722 | Fawick | Mar. 1, 1938 |
| 2,181,008 | Bonzack | Nov. 21, 1939 |
| 2,248,684 | Levy | July 8, 1941 |
| 2,265,938 | Eksergian | Dec. 9, 1941 |
| 2,392,225 | Butler | Jan. 1, 1946 |
| 2,633,944 | Butterfield | Apr. 7, 1953 |
| 2,646,862 | Dodge | July 28, 1953 |